(No Model.) 3 Sheets—Sheet 1.
J. T. MANNING.
FILTER AND VALVE APPARATUS THEREFOR.
No. 594,640. Patented Nov. 30, 1897.
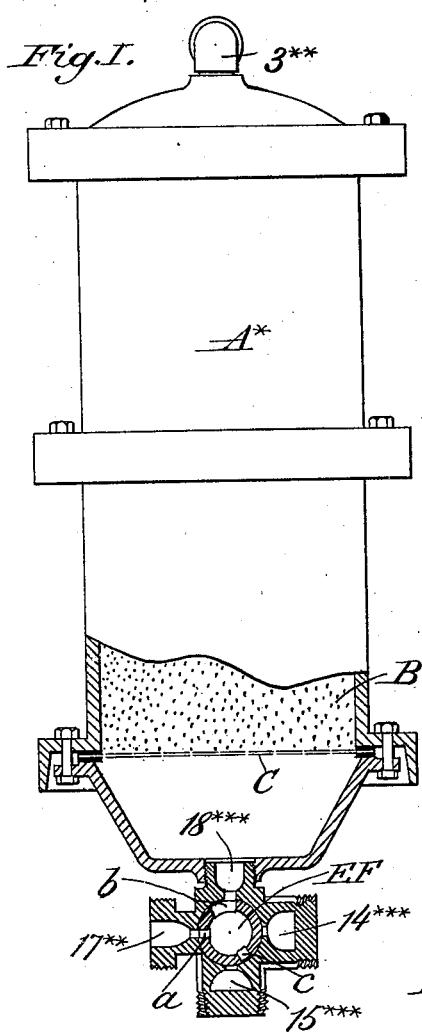
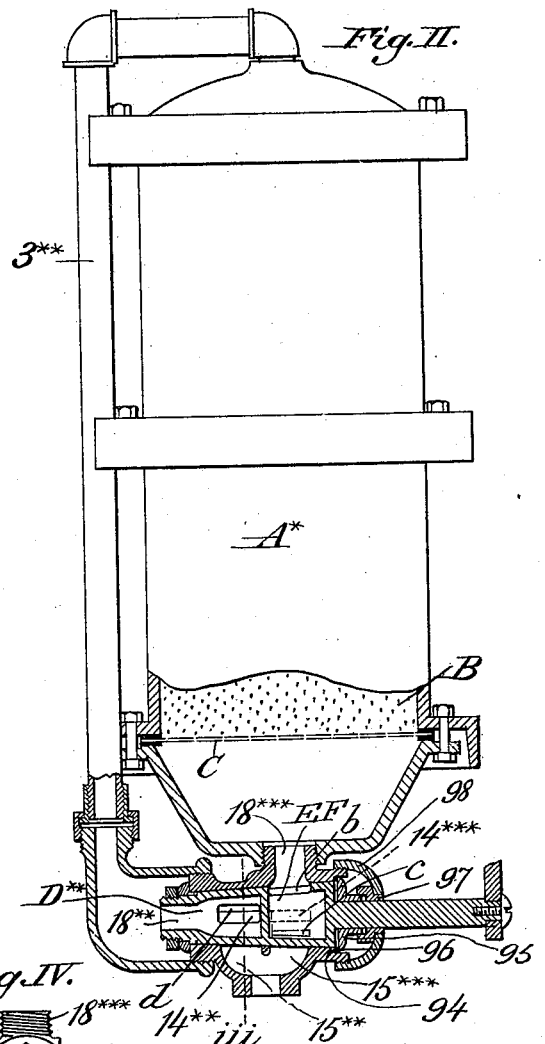
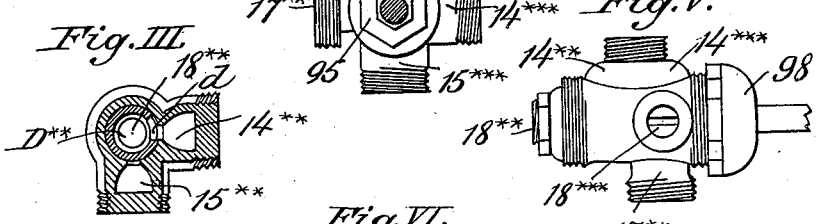
Attest:
Walter W. H. Robinson Jr.
F. H. Schott
Inventor:
Joseph T. Manning
by Chas. J. Hedrick
his attorney (No Model.) 3 Sheets—Sheet 2.
J. T. MANNING.
FILTER AND VALVE APPARATUS THEREFOR.
No. 594,640. Patented Nov. 30, 1897.
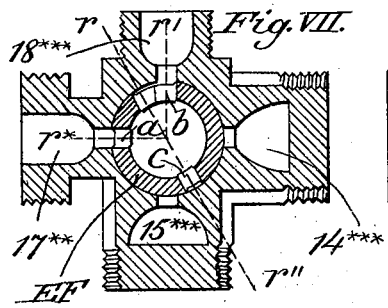
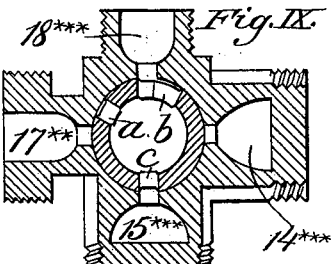
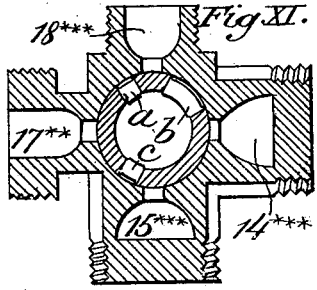
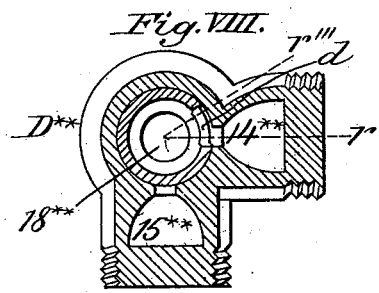
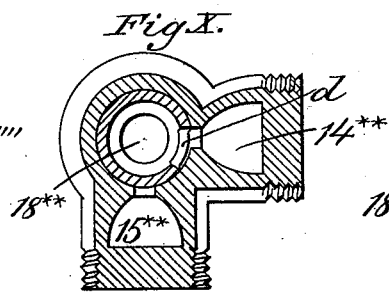
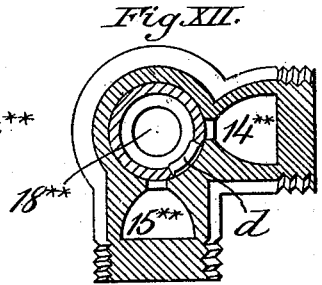
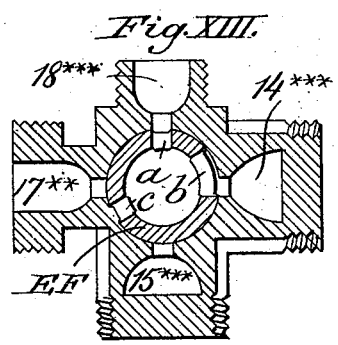
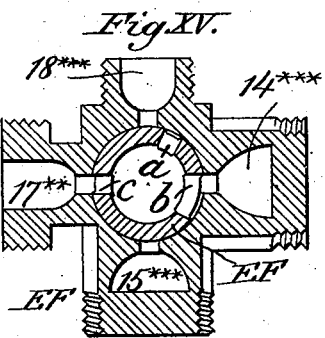
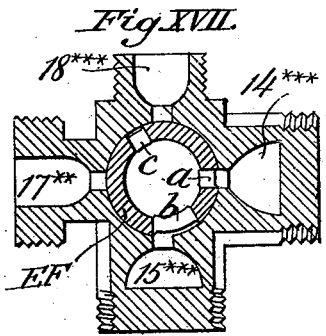
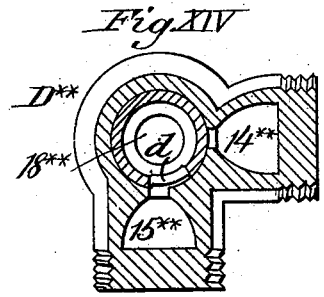
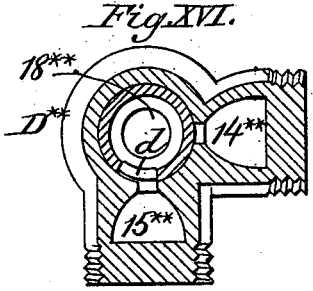
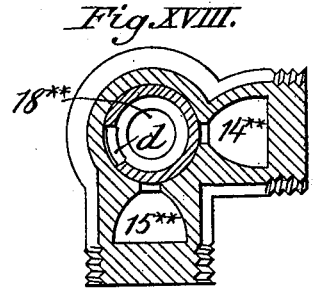
Attest:
Walter W. H. Robinson Jr.
F. H. Schott
Inventor:
Joseph T. Manning
by Chas. J. Hedrick
his attorney

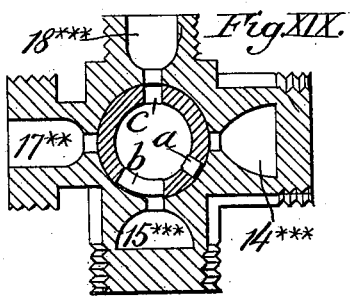
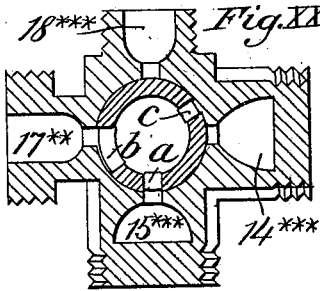
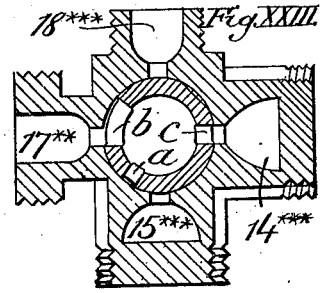
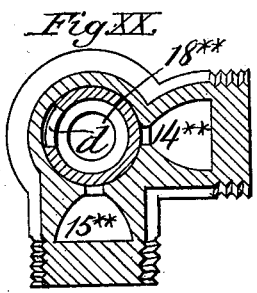
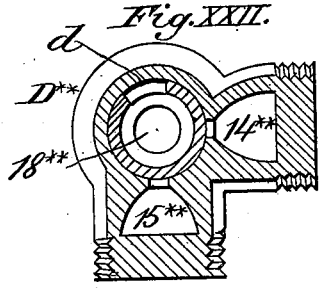
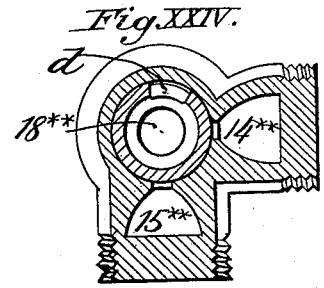
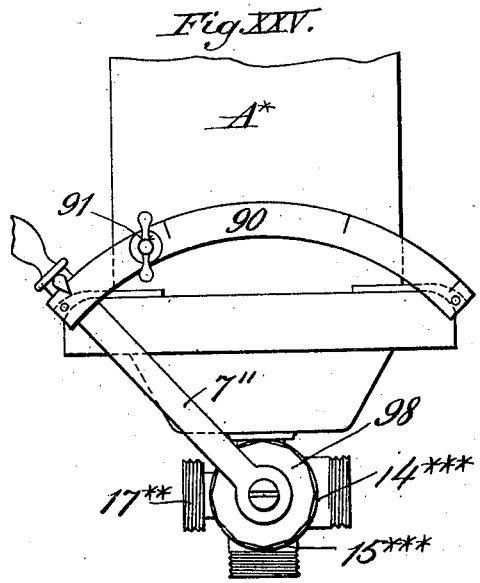
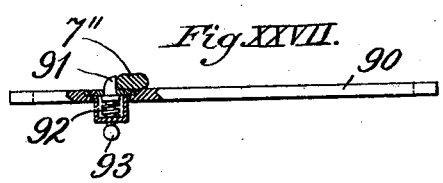

UNITED STATES PATENT OFFICE.

JOSEPH T. MANNING, OF PHILADELPHIA, PENNSYLVANIA, ASSIGNOR TO THE LOOMIS-MANNING FILTER COMPANY, OF SAME PLACE.

FILTER AND VALVE APPARATUS THEREFOR.

SPECIFICATION forming part of Letters Patent No. 594,640, dated November 30, 1897.

Original application filed December 13, 1893, Serial No. 493,563. Divided and this application filed June 24, 1897. Serial No. 642,143. (No model.)

*To all whom it may concern:*

Be it known that I, JOSEPH T. MANNING, a citizen of the United States, residing at Philadelphia, in the county of Philadelphia and State of Pennsylvania, have invented certain new and useful Improvements in Filters and Valve Apparatus Therefor; and I do hereby declare the following to be a full, clear, and exact description of the invention.

This invention relates more particularly to what may be briefly described as self-cleansing granular-bed filters; but each of the improvements is intended to be secured for all the uses to which it may be adapted.

In self-cleansing granular-bed filters the water is passed through granular material—like sand, for example—of greater or less fineness, and from time to time this granular material is cleaned of the impurities which it has removed from the water by subjecting the said granular material to currents of water adapted to break up the bed and carry off the impurities, leaving the granular material in a fit state for another operation. It has also been customary to provide means whereby the water which is first passed through the filter in the filtering direction after a cleansing operation can be diverted into a waste instead of being allowed to pass into the outlet for the purified water. The reason for this is found in the fact that after a cleansing operation the water which for a time passes through the filtering material in the filtering direction is apt to carry with it more or less impurities. When this filtered water becomes clear, it is allowed to pass to the pure-water outlet. Sometimes means are provided to supply water which has been filtered for cleansing the granular material.

In accordance with the present invention a filter-chamber is combined with a valve apparatus for effecting the passage of the water through the filter in either direction to waste or in the filtering direction to house, (or, in other words, to the pure-water outlet,) the invention consisting in the constructions, arrangements, combinations, and improvements herein set forth.

Some of these features of invention are new and useful, however, irrespective of their combination with a filter, and a few of them, as will be explained below, whether used or not used in such combination, are new and useful irrespective of a capacity for effecting the passage of water in all of the three several modes above specified. Moreover, it is often desirable to be able to cut out a filter (for repairs or renewal of filtering material or the like) and while the filter is thus cut out to allow the flow of water to continue on through a by-pass, and, further, it is often desirable to drain the water from the filter or filter-pipes. The invention includes certain constructions, arrangements, combinations, or improvements which are useful for making by-pass or drainage connections.

In the accompanying drawings, which form part of the specification and illustrate what is considered the best mode of carrying the invention into effect, Figures I and II are views, partly in elevation and partly in section, in planes at right angles to each other, of a filter provided with a valve apparatus in accordance with the invention. Fig. III is a vertical section of the valve apparatus detached, the section being in line *i i i* of Fig. II. Fig. IV is an end view of the valve detached, with the cap removed from the end of the valve-casing. Figs. V and VI are respectively a plan and a horizontal section of the valve detached. Figs. VII and VIII, IX and X, XI and XII, XIII and XIV, XV and XVI, XVII and XVIII, XIX and XX, XXI and XXII, and XXIII and XXIV are views showing the communication through the valve in different positions of its key portion. Figs. XXV and XXVI are partial elevations, in planes at right angles with each other, of a filter provided with the same valve apparatus and having also an arc with a lever-arm traveling over the same; and Fig. XXVII is a plan view, partly in section, of said arc and lever-arm to illustrate the operation of a stop used on said arc.

The filter A* is provided with granular filtering material B, which is supported on the perforated diaphragm C and is connected with a valve apparatus consisting of current-reversing and filtered-water valves D** and E F. The valve apparatus is shown as arranged below the filter-chamber A* and as connected with the top of said chamber by an upright pipe 3\*\*, so that said chamber and pipe can be emptied or drained through said apparatus; but the operation of said apparatus otherwise is not dependent upon this location of the valve apparatus relative to said filter. There are, as shown, seven casing-passages, (marked 14\*\*, 14\*\*\*, 15\*\*, 15\*\*\*, 17\*\*, 18\*\*, and 18\*\*\*.) They each lead to an outside opening. In the case of the passages 14\*\* and 14\*\*\* the outside opening is common to both, (see Fig. VI,) and this is preferable where the passages are to be joined to the same pipe, as it saves a coupling. The passages 15\*\* and 15\*\*\* (see Fig. II) in like manner lead to an outside opening common to them both for the same reason.

The valve D\*\* has a port which is continued as the passage 18\*\* through the rear end of the casing (thus forming a casing-passage as well as a key-port) and also a movable port $d$, which is arranged to be alternately put in communication with the passage 14\*\* or the passage 15\*\*. The port $d$ is, however, a double one, so that shifting the key does not necessarily break the communication already established.

The double valve E F has ports $a\ b\ c$. It serves in one position (that of Figs. I and VII) to put the passage 18\*\*\* in separate communication with the passage 17\*\*. In a second position (that of Fig. IX) it serves to put the passage 18\*\*\* in separate communication with the passage 15\*\*\*. In a third position (that of Fig. XIII) it serves to put the passage 18\*\*\* in separate communication with the passage 14\*\*\*. Thus in each of said three positions this valve E F puts the casing-passage 18\*\*\* in separate communication with a different one of the three others shown in Fig. I.

The valve D\*\* is connected with the valve E F for conjoint operation, or, in other words, it is so connected therewith mechanically as that the two valves are manipulated together. As shown, (and this is a special advantageous arrangement,) they are connected by making the various ports at suitable points in the same key. In the three positions of the valve E F before referred to the valve D\*\* puts the passage 18\*\* in separate communication with one or other of the passages 14\*\* and 15\*\*. Figs. I and III, as also Figs. VII and VIII, show the two valves in the first of these positions. Figs. IX and X show them in the second, and Figs. XIII and XIV show them in the third position mentioned.

The connection shown of the valve apparatus and the filter A\* is such that of the four casing-passages before mentioned belonging to the valve E F the passage 18\*\*\* is in communication with the filtered-water end of said filter, (the filtration being effected by a current downward and the washing of the filtering material by an upward current,) while the passages 17\*\*, 15\*\*\*, and 14\*\*\* are respectively for delivering water to the house, for delivering water to waste, and for supplying water from the street-main or other source of supply. Of the three casing-passages belonging to the valve D\*\* the passage 18\*\* is in communication with the opposite end of said filter, while the remaining two passages 14\*\* and 15\*\* are for establishing a supply and a waste connection, respectively. When, therefore, the movable ports $a\ b\ c\ d$ are in the "filtering-to-house position," as in Figs. I and III, (Figs. VII and VIII show the same,) the water goes by passage 14\*\*, valve D\*\*, passage 18\*\*, and pipe 3\*\* to the top of the filter-chamber A\*, flows through the same in the filtering direction, and then goes to house by way of the passage 18\*\*\*, ports $b\ a$, and passage 17\*\*. By turning the key to the right until the movable ports are in the positions shown in Figs. IX and X the only connections are those altered of the passage 18\*\*\*, which now comes into communication with the waste-passage 15\*\*\*, and of the passage 17\*\*, which is closed. This is the "filtering-to-waste" position, which is useful after a washing operation. By turning the key to the right until the movable ports are in the positions shown in Figs. XIII and XIV (which is the washing position) the water will enter the filter A\* at the bottom, pass upward through the same in the washing direction, enter the valve D\*\* by pipe 3\*\*, and go to waste by the passage 15\*\*. After the washing operation the key should be turned back to the filtering-to-waste position, in which position the water will, as already explained, go through the chamber A\* in the filtering direction, but the filtered water will pass to waste. From passage 18\*\*\* it will go through ports $b$ and $c$ and passage 15\*\*\*. Whenever the filtered water shows clear, the key is turned again to the left, whereupon the filtered water goes to the house by passage 17\*\*.

It is advantageous to make the various passages or ways in one compound casing, as shown, rather than in two or more casings connected by fittings or otherwise.

With the key and casing shown not only may the passage 18\*\*\* be put in separate communication with each of the other three casing-passages of Fig. I, but two of these latter may be put in communication with each other, for if the ports $c$ and $b$ be made to register with the passages 17\*\* and 14\*\*\* these passages will be connected with each other. This would occur whether the port $c$ registered with the end of the supply-passage 14\*\*\*, as in Fig. XXIII, or whether the said port $c$ registered with the end of the house-passage 17\*\*, as in Fig. XV. In the first-mentioned of these two positions the valve D\*\* is closed to all passage of water through the same, as shown in Fig. XXIV, and in the second-mentioned of said positions the valve D\*\* opens the communication from the passage 18\*\* to the passage 15\*\*, as shown in Fig. XVI. The passage 14\*\*\* may also be put in separate communication with the passage 15\*\*\*, as shown in Fig. XVII, the corresponding position of the valve D being shown in Fig. XVIII, and the passages 17 and 15* can also be connected with each other, as shown in Fig. XXI, the corresponding position of the valve D being shown in Fig. XXII.

With the passages connected as before described—that is to say, the passages 14 and 14* with the supply, the passages 15 and 15* with the waste, the passage 17 with the house, and the passages 18 and 18* with the filter—the registry of the port c with either the passage 14*, Figs. XXIII and XXIV, or the passage 17, Figs. XV and XVI, will form a by-pass, the filter being cut off and the water supplied by the passage 14* passing directly to the house-passage 17**.

It will be observed that the intercommunications effected between the passages by the valve apparatus shown are directly through the key portions of said valve apparatus, or, in other words, the water in passing from a supply to a filter passage, a waste or a house passage, traverses the key directly from one passage to another. So, also, the passage of water from a filter-passage to a house or a waste passage is direct.

In passing from the filtering-to-waste position, Figs. IX and X, to the washing position, Figs. XIII and XIV, the key passes through a position in which the flow of water through the same is stopped. This position is shown in Figs. XI and XII.

With the valve apparatus arranged below the filter, as shown, the waste-passage 15 would be open to the filter through the port d and pipe 3 (see Fig. XVI) when the by-pass is established by bringing the port c in registry with the end of the house-passage 17, as in Fig. XV. This would relieve the filter of pressure and would drain the pipe 3. By making the port c register with the filter-passage 18*, as in Fig. XIX, the filter can be emptied through the waste-passage 15*, since in this position of the key D E F the supply-passages are both, Figs. XIX and XX, cut off from the filter. Having been given this filter-draining position, the arrangement of ports shown allows the by-pass to be established by turning the key either to the right, to the position of Figs. XXIII and XXIV, or to the left, to the position of Figs. XV and XVI, without filling the filter again with water. In making the movement to the right the position of Figs. XXI and XXII is passed through. In this the house-passage would be connected with the waste-passage. In making the movement to the left from the position of Figs. XIX and XX the position of Figs. XVII and XVIII is passed through. In this the supply-passage 14* would be connected with the waste-passage 15***.

The position shown in Figs. XI and XII is not the only one in which the key will stop the flow of water completely, for there would be another in each quarter of a revolution of the key; but it is not considered necessary to show these other positions in which the flow is completely arrested.

In Figs. XXV, XXVI, and XXVII there is an attachment to the valve apparatus for aiding in its manipulation. In the arc 90 is a stop 91, consisting of a spring-pressed pin with its nose beveled on one end. When the lever 7'' for operating the valve-key is to the left of the stop, this latter does not interfere with the motion of the lever to the right, since the lever acts upon the bevel to push back the pin against the pressure of the spring 92. When, however, the lever is to the right of the stop, this latter checks it if an attempt be made to move the lever past the stop without first withdrawing it. The head 93 of the pin is adapted to allow its withdrawal when desired. The stop is placed to arrest the key in the filtering-to-waste position. For cleansing the filter, therefore, the attendant can move the key readily from the filtering-to-house to the "washing" position, and by moving the operating-lever back and forth can alternately change the filter-current without sending dirty water to the house and without requiring care to be taken by him to avoid such a result, because the stop 91 will arrest the lever 7''. When, however, it is desired to send the water to house, the removal of the stop is necessary, in order that the key can be turned to the left to the desired position.

As shown in Fig. XXV, the pins which attach the arc 90 to the filter act as stops to limit the arm 7'' to an angular movement of ninety degrees; but the said arc 90 is an accessory device and not of the essence of the valves, like their keys and casings, and it may obviously be made as long as the user of the apparatus may desire, or it can be omitted altogether.

By omitting port c (or closing so much of port b as is diametrically opposite said port c) the key would still serve for sending the current in either direction through the filter. The current in such case would pass through the filter in the filtering direction to the house-passage 17** and there would be no filtering-to-waste position.

In the valves shown the movable ports a b c open from the same central chamber in the front part of the key, and the ports in the valve D—namely, the port d and the end port, of which passage 18 is a continuation—in like manner open from the same central chamber in the rear part of the key. In the valve E F (see Fig. VII) the passages in the casing are each separated from the next passage on either side by an angle of ninety degrees, and the key-ports a b c are at the ends of four radii, $r$ $r'$ $r''$ $r^*$, two of which, $r$ and $r''$, are in line with each other on opposite sides of the center, while the other two, $r'$ and $r^*$, are separated from each other by an angle of ninety degrees and lie on opposite sides of the first-mentioned two radii $r$ and $r''$. In the valve D (see Fig. VIII) there are three casing-passages—namely, the side passages 14 and 15 and the passage 18 at the end of the casing—and the said passages 14 and 15 are separated from each other by an angle of ninety degrees. The port $d$ in this part of the key lies at the ends of the two radii $r'''$ and $r''''$, which form an oblique angle with each other. The angle between these radii is, in fact, the same as that between the radii $r\ r'$ of Fig. VII.

The apparatus shown also embodies improvements in packing the stem of the valve-key. Around the stem of the key is a shoulder 94, and the disk 95 bears against the same, with a packing-ring 96 interposed, and has means for pressing it against the shoulder. Further, a stuffing-box is formed by and between the disk 95 and the follower 97 around the valve-stem. The follower could be screwed or otherwise forced down directly on the disk 95, thus tightening at one operation the stuffing-box and the packed joint at 96. It is advantageous, however, to screw this down indirectly by means of a screw-cap 98 or other holding means having a swivel connection with the follower, and this latter is held from turning by any suitable means—as, for example, by making it and the disk 95 of hexagonal outline, as seen in Fig. IV, or of other angular or irregular figure and having them fit in or over correspondingly-shaped devices. With this arrangement the turning of the key has no tendency to loosen the stuffing-box. The follower held from turning and provided with a swiveled screw-cap could be used in other connections—as, for example, with a nut in place of the disk and packing-ring.

The present application is a division of my original application of December 13, 1893, Serial No. 493,563, this divisional application being made in consequence of the rulings of the Patent Office in the matter of my said original application. The improvements in packing the stem of the valve-key are claimed in my said original application, they being applicable to the stem of any of the keys shown therein.

I claim herein as my invention or discovery—

1. In combination with a filter, a valve apparatus connected with the filter and having two supply-passages together with waste, house and filter passages, as well as movable ports mechanically connected with one another for conjoint operation, said ports being arranged to form current-reversing, filtered-water and by-pass valves, so that in different positions of said ports water from one or other of said supply-passages may be sent through the filter to waste in either direction or to house in the filtering direction or may be sent to house without passing through the filter, substantially as described.

2. In combination with a filter, a valve apparatus connected with the filter and having two supply-passages, together with waste, house and filter passages all in one compound casing, as well as movable ports mechanically connected with one another for conjoint operation by being made in the same key, said ports being arranged to form current-reversing, filtered-water and by-pass valves, so that in different positions of said ports water from one or other of said supply-passages may be sent through the filter to waste in either direction or to house in the filtering direction or may be sent to house without passing through the filter, substantially as described.

3. In combination with a filter, a valve apparatus placed below said filter and comprising current-reversing, filtered-water and filter-draining valves connected with one another for conjoint operation, so that in different positions of said valves the water may be sent through the filter in the filtering direction to house, or in the filtering direction to waste, or in the washing direction to waste, and that in a fourth position of said valves the bottom of said filter may be put in communication with the waste for emptying said filter, while at the same time the filter is cut off from the house and supply passages, substantially as described.

4. In combination with a filter, a valve apparatus placed below said filter and comprising current-reversing, filtered-water and filter-draining valves connected with one another for conjoint operation by being made in one key turning in one compound casing, so that in different positions of said valves the water may be sent through said filter in the filtering direction to house, or in the filtering direction to waste, or in the washing direction to waste, and that in a fourth position of said valves the bottom of said filter may be put in communication with the waste for emptying said filter, while at the same time the filter is cut off from the house and supply passages, substantially as described.

5. In combination with a filter, a valve apparatus placed below said filter and comprising current-reversing, filtered-water, filter-draining and by-pass valves connected with one another for conjoint operation, so that in different positions of said valves the water may be sent through the filter in the filtering direction to house, or in the filtering direction to waste, or in the washing direction to waste, or may be cut off from the filter while at the same time the bottom of said filter is put in communication with the waste for emptying said filter, or may be prevented from flowing through the filter while at the same time it is sent to house through the by-pass connection, substantially as described.

6. In combination with a filter, a valve apparatus placed below said filter and comprising current-reversing, filtered-water, filter-draining and by-pass valves connected with one another for conjoint operation by being made of one key turning in one compound casing, so that in different positions of said valves the water may be sent through the filter in the filtering direction to the house, or in the filtering direction to waste, or in the washing direction to waste, or may be cut off from the filter while at the same time the bottom of said filter is put in communication with the waste for emptying said filter, or may be prevented from flowing through the filter while at the same time it is sent through the by-pass connection, substantially as described.

7. A valve apparatus having seven casing-passages leading to outside openings together with movable ports mechanically connected with one another for conjoint operation and arranged in each of three positions to put one of said casing-passages in separate communication with a different one of three others, and also in each of said positions to put a fifth one of said passages in separate communication with one or other of the remaining two, substantially as described.

8. In combination with a filter, a valve apparatus having seven casing-passages together with movable ports mechanically connected with one another for conjoint operation, one of said passages being in communication with the filtered-water end of said filter, three others forming house, waste and supply passages respectively, a fifth one of said passages being in communication with the opposite end of said filter, and the remaining two forming supply and waste passages respectively, and said movable ports being arranged in one position to put the first-mentioned filter-passage in communication with the house-passage and the second-mentioned filter-passage in communication with the supply-passage, in a second position to put the first-mentioned filter-passage in communication with the waste-passage and the second-mentioned filter-passage in communication with a supply-passage, and in a third position to put the first-mentioned filter-passage in communication with a supply-passage and the second-mentioned filter-passage in communication with a waste-passage, substantially as described.

9. A valve apparatus having seven casing-passages leading to outside openings in one compound casing together with movable ports mechanically connected with one another for conjoint operation by being made in the same key and arranged in each of three positions to put one of said passages in separate communication with a different one of three others and also in each of said positions to put a fifth one of said passages in separate communication with one or other of the remaining two, substantially as described.

10. In combination with a filter, a valve apparatus having seven casing-passages in one compound casing together with movable ports mechanically connected with one another for conjoint operation by being made in the same key, one of said passages being in communication with the filtered-water end of said filter, three others forming house, waste and supply passages respectively, a fifth one of said passages being in communication with the opposite end of said filter, and the remaining two forming supply and waste passages respectively, and said movable ports being arranged in one position to put the first-mentioned filter-passage in communication with the house-passage and the second-mentioned filter-passage in communication with a supply-passage, in a second position to put the first-mentioned filter-passage in communication with a waste-passage and in a second-mentioned filter-passage in communication with a supply-passage, and in a third position to put the first-mentioned filter-passage in communication with a supply-passage and the second-mentioned filter-passage in communication with a waste-passage, substantially as described.

11. A valve apparatus having seven casing-passages leading to outside openings together with movable ports mechanically connected with one another for conjoint operation and arranged in each of three positions to put one of said casing-passages in separate communication with a different one of three others, and when given a fourth position to connect two of said three passages with each other, said ports being also arranged in each of the three positions first mentioned to put a fifth one of said passages in separate communication with one or other of the remaining two, substantially as described.

12. In combination with a filter, a valve apparatus having seven casing-passages together with movable ports mechanically connected with one another for conjoint operation, one of said passages being in communication with the filtered-water end of said filter, three others forming house, waste and supply passages respectively, a fifth one of said passages being in communication with the opposite end of said filter, and the remaining two forming supply and waste passages respectively, and said movable ports being arranged in one position to put the first-mentioned filter-passage in communication with the house-passage and the second-mentioned filter-passage in communication with a supply-passage, in a second position to put the first-mentioned filter-passage in communication with a waste-passage and the second-mentioned filter-passage in communication with a supply-passage, in a third position to put the first-mentioned filter-passage in communication with a supply-passage and the second-mentioned filter-passage in communication with a waste-passage, and when given a fourth position to establish a by-pass from a supply-passage to the house-passage while at the same time the metal in the key portion of the valve apparatus stops the flow of water through the filter, substantially as described.

13. A valve apparatus having seven casing-passages in one compound casing together with movable ports mechanically connected with one another for conjoint operation by being made in one key and arranged in each of three positions to put one of said passages in separate communication with a different one of three others and when given a fourth position to connect two of said three passages with each other, said ports also being arranged in each of the three positions first mentioned to put a fifth one of said passages in separate communication with one or other of the remaining two, substantially as described.

14. In combination with a filter, a valve apparatus having seven casing-passages in one compound casing together with movable ports mechanically connected with one another for conjoint operation by being made in the same key, one of said passages being in communication with the filtered-water end of said filter, three others forming house, waste and supply passages respectively, a fifth one of said passages being in communication with the opposite end of said filter, and the remaining two forming supply and waste passages respectively, and said movable ports being arranged in one position to put the first-mentioned filter-passage in communication with the house-passage and the second-mentioned filter-passage in communication with a supply-passage, in a second position to put the first-mentioned filter-passage in communication with a waste-passage and the second-mentioned filter-passage in communication with a supply-passage, and in a third position to put the first-mentioned filter-passage in communication with a supply-passage and the second-mentioned filter-passage in communication with a waste-passage, and when given a fourth position to establish a by-pass from a supply-passage to the house-passage while at the same time the metal of the key portion of the valve apparatus stops the flow of water through the filter, substantially as described.

15. A valve apparatus having seven casing-passages leading to outside openings together with movable ports mechanically connected with one another for conjoint operation and arranged in each of three positions to put one of said casing-passages in separate communication directly through the key portion of said apparatus with a different one of three other passages and also in each of said positions to put a fifth one of said passages in separate communication directly through the said key portion with one or other of the remaining two, substantially as described.

16. In combination with a filter, a valve apparatus having seven casing-passages together with movable ports mechanically connected with one another for conjoint operation, one of said passages being in communication with the filtered-water end of said filter, three others forming house, waste and supply passages respectively, a fifth one of said passages being in communication with the opposite end of said filter and the remaining two forming supply and waste passages respectively, and said movable ports being arranged in one position to put the first-mentioned filter-passage in communication directly through the key portion of said valve apparatus with the house-passage and the second-mentioned filter-passage in communication directly through the key portion with a supply-passage, in a second position to put the first-mentioned filter-passage in communication directly through the key portion with a waste-passage and the second-mentioned filter-passage in communication directly through the key portion with a supply-passage, and in a third position to put the first-mentioned filter-passage in communication directly through the key portion with a supply-passage and the second-mentioned filter-passage in communication directly through the key portion with a waste-passage, substantially as described.

17. A valve apparatus having seven casing-passages leading to outside openings in one compound casing together with movable ports mechanically connected with one another for conjoint operation by being made in the same key and arranged in each of three positions to put one of said passages in separate communication directly through the said key with a different one of three other passages and also in each of said positions to put a fifth one of said passages in separate communication directly through the said key portion with one or other of the remaining two, substantially as described.

18. In combination with a filter, a valve apparatus having seven casing-passages in one compound casing together with movable ports mechanically connected with one another for conjoint operation by being made in the same key, one of said passages being in communication with the filtered-water end of said filter, three others forming house, waste and supply passages respectively, a fifth one of said passages being in communication with the opposite end of said filter, and the remaining two forming supply and waste passages respectively, and said movable ports being arranged in one position to put the first-mentioned filter-passage in communication directly through the said key with the house-passage, and the second-mentioned filter-passage in communication directly through the said key with a supply-passage, in a second position to put the first-mentioned filter-passage in communication directly through the said key with a waste-passage and the second-mentioned filter-passage in communication directly through the said key with a supply-passage, and in a third position to put the first-mentioned filter-passage in communication directly through the said key with a supply-passage and the second-mentioned filter-passage in communication directly through the said key with a waste-passage, substantially as described.

19. A valve apparatus having seven casing-passages leading to outside openings together with movable ports mechanically connected with one another for conjoint operation and so arranged that in three positions of said ports one of said passages is put in separate communication with a second, a third and a fourth passage respectively, while in two of said positions a fifth passage is separately put in communication with a sixth and in a third position with a seventh passage, and that when given a fourth position the metal in the key portion of said valve apparatus closes two at least of said second, third and fourth passages and one at least of said sixth and seventh passages without said ports establishing all the communications of any of the first three positions, substantially as described.

20. In combination with a filter, a valve apparatus having seven casing-passages leading to outside openings together with movable ports mechanically connected with one another for conjoint operation, one of said passages being in communication with the filtered-water end of said filter, a second, a third, and a fourth passage forming a house, a waste and a supply passage respectively, a fifth passage being in communication with the opposite end of said filter, and a sixth and a seventh passage forming a supply and a waste passage respectively, said movable ports being so arranged that in one position the first-mentioned filter-passage is put in communication with the house-passage and the second-mentioned filter-passage in communication with a supply-passage, that in a second position the first-mentioned filter-passage is put in communication with a waste-passage and the second-mentioned filter-passage in communication with a supply-passage, that in a third position the first-mentioned filter-passage is put in communication with a supply-passage and the second-mentioned filter-passage in communication with a waste-passage, and that in a fourth position the metal in the key portion of said valve apparatus stops the flow of water through said valve apparatus as well to house as to waste, substantially as described.

21. A valve apparatus, having seven casing-passages leading to outside openings in one compound casing together with movable ports mechanically connected with one another for conjoint operation by being made in the same key and so arranged that in three positions of said ports one of said passages is put in separate communication with a second, a third and a fourth passage respectively, while in two of said three positions a fifth passage is separately put in communication with a sixth and in a third position with a seventh passage, and that when given a fourth position the metal in the key portion of said valve apparatus closes two at least of said second, third and fourth passages and one at least of said sixth and seventh passages without said ports establishing all the communications of any of the first three positions, substantially as described.

22. In combination with a filter, a valve apparatus having seven casing-passages leading to outside openings in one compound casing together with movable ports mechanically connected with one another for conjoint operation by being made in the same key, one of said passages being in communication with the filtered-water end of said filter, a second, a third and a fourth passage forming a house, a waste and a supply passage respectively, a fifth passage being in communication with the opposite end of said filter, and a sixth and seventh passage forming a supply and a waste passage respectively, and said movable ports being so arranged that in one position the first-mentioned filter-passage is put in communication with the house-passage and the second-mentioned filter-passage in communication with a supply-passage, that in a second position the first-mentioned filter-passage is put in communication with a waste-passage and the second-mentioned filter-passage in communication with a supply-passage, that in a third position the first-mentioned filter-passage is put in communication with a supply-passage and the second-mentioned filter-passage in communication with a waste-passage, and that when given a fourth position the metal in the key portion of said valve apparatus stops the flow of water through the said valve apparatus as well to house as waste, substantially as described.

23. A valve apparatus having seven casing-passages leading to outside openings together with movable ports mechanically connected with one another for conjoint operation and so arranged that in three positions of said ports one of said passages is put in separate communication with a second, a third and a fourth passage respectively, while in two of said three positions a fifth passage is separately put in communication with a sixth and in a third position with a seventh passage, and that when given a fourth position the first-mentioned passage is put in communication with one of the next-mentioned two without establishing the intercommunication of said fifth and sixth passages, substantially as described.

24. A valve apparatus having seven casing-passages leading to outside openings together with movable ports mechanically connected with one another for conjoint operation and so arranged that in three positions of said ports one of said passages is put in separate communication with a second a third and a fourth passage respectively, while in two of said three positions a fifth passage is separately put in communication with a sixth and in a third position with a seventh passage, and that when given a fourth position the intercommunication of said fifth and seventh passages is established without establishing the intercommunication of the said first and fourth passages, substantially as described.

25. In combination with a filter, a valve apparatus placed below said filter and having seven casing-passages leading to outside openings together with movable ports mechanically connected with one another for conjoint operation, two of said passages being in communication with said filter, another passage forming a house-passage, two others forming waste-passages, and two others still forming supply-passages, and said movable ports being so arranged that in three of said positions thereof one filter-passage is separately put in communication with a house, a waste and a supply passage respectively while the other filter-passage is in two of said three positions put in communication with a supply and in a third position with a waste passage, and that when given a fourth position a filter-passage is put in communication with a waste-passage without putting either supply-passage in communication with the filter, substantially as described.

26. In combination with a filter, a valve apparatus placed below said filter and having seven casing-passages leading to outside openings together with movable ports mechanically connected with one another for conjoint operation, two of said passages being in communication with the said filter, another passage forming a house-passage, two others forming waste-passages, and two others still forming supply-passages, and said movable ports being so arranged that in three positions thereof one filter-passage is separately put in communication with a house, a waste and a supply passage respectively while the other filter-passage is in two of said three positions put in communication with a supply and in a third position with a waste passage, and that when given a fourth position the bottom of said filter is put in communication with a waste-passage without putting either supply-passage in communication with the filter, substantially as described.

27. In combination with a filter, a valve apparatus placed below said filter and having seven casing-passages leading to outside openings together with movable ports mechanically connected with one another for conjoint operation, two of said passages being in communication with the said filter, another passage forming a house-passage, two others forming waste-passages, and two others still forming supply-passages, and said movable ports being so arranged that in three positions thereof one filter-passage is separately put in communication with a house, a waste and a supply passage respectively while the other filter-passage is in two of said three positions put in communication with a supply and in a third position with a waste passage, and that when given a fourth position the top of said filter is put in communication with a waste-passage without putting either supply-passage in communication with the filter, substantially as described.

28. A valve apparatus having seven casing-passages leading to outside openings in one compound casing together with movable ports mechanically connected with one another for conjoint operation by being made in the same key and so arranged that in three positions of said ports one of said passages is put in separate communication with a second, a third and a fourth passage respectively, while in two of said three positions a fifth passage is separately put in communication with a sixth and in a third position with a seventh passage, and that when given a fourth position the first-mentioned passage is put in communication with one of the next-mentioned two without establishing the intercommunication of said fifth and sixth passages, substantially as described.

29. A valve apparatus having seven casing-passages leading to outside openings in one compound casing together with movable ports mechanically connected with one another for conjoint operation by being made in the same key and so arranged that in three positions of said ports one of said passages is put in separate communication with a second, a third and a fourth passage, respectively, while in two of said three positions a fifth passage is separately put in communication with a sixth and in a third position with a seventh passage, and that when given a fourth position the intercommunication of said fifth and seventh passages is established without establishing the intercommunication of the said first and fourth passages, substantially as described.

30. In combination with a filter, a valve apparatus placed below said filter and having seven casing-passages leading to outside openings in one compound casing together with movable ports mechanically connected with one another for conjoint operation by being made in the same key, two of said passages being in communication with said filter, another passage forming a house-passage, two others forming waste-passages, and two others still forming supply-passages, and said movable ports being so arranged that in three positions thereof one filter-passage is separately put in communication with a house, a waste and a supply passage respectively while the other filter-passage is in two of said three positions put in communication with a supply and in a third position with a waste passage, and that when given a fourth position a filter-passage is put in communication with a waste-passage without putting either supply-passage in communication with the filter, substantially as described.

31. In combination with a filter, a valve apparatus suitably placed below said filter for emptying the same through said apparatus and having seven casing-passages leading to outside openings in one compound casing together with movable ports mechanically connected with one another for conjoint operation by being made in the same key, two of said passages being in communication with the said filter, another passage forming a house-passage, two others forming waste-passages, and two others still forming supply-passages, and said movable ports being so arranged that in three positions thereof one filter-passage is separately put in communication with the house a waste and a supply passage respectively, while the other filter-passage is in two of said three positions put in communication with a supply and in a third position with a waste passage and that when given a fourth position the bottom of said filter is put in communication with a waste-passage, without putting either supply-passage in communication with the filter, substantially as described.

32. In combination with a filter, a valve apparatus suitably placed below said filter for emptying the same through said apparatus and having seven casing-passages leading to outside openings in one compound casing together with movable ports mechanically connected with one another for conjoint operation by being made in the same key, two of said passages being in communication with the said filter, another passage forming a house-passage, two others forming waste-passages, and two others still forming supply-passages, and said movable ports being so arranged that in three positions thereof one filter-passage is separately put in communication with the house, a waste and a supply passage respectively, while the other filter-passage is in two of said three positions put in communication with a supply and in a third position with a waste passage, and that when given a fourth position the top of said filter is put in communication with a waste-passage, without putting either supply-passage in communication with the filter, substantially as described.

33. A valve apparatus having seven casing-passages leading to outside openings together with movable ports mechanically connected with one another for conjoint operation and so arranged that in three positions of said ports one of said passages is separately put in communication with a second a third, and a fourth passage respectively, while in two of said positions a fifth passage is separately put in communication with a sixth and in a third position with a seventh passage, the arrangement of said ports being also such that when given a fourth position the first-mentioned passage is put in communication with one of the next-mentioned two without establishing the intercommunication of said fifth and sixth passages and that when given a fifth position said fourth passage is put in separate communication with one of the passages designated as the "second" and "third," substantially as described.

34. A valve apparatus having seven casing-passages leading to outside openings together with movable ports mechanically connected with one another for conjoint operation and so arranged that in three positions of said ports one of said passages is separately put in communication with a second a third and a fourth passage respectively, while in two of said positions a fifth passage is separately put in communication with a sixth and in a third position with a seventh passage, the arrangement of said ports being also such that when given a fourth position the intercommunication is established of the said fifth with said seventh passage and of said fourth with one of said second and third passages without establishing the communication of the first-mentioned with said fourth passage, substantially as described.

35. In combination with a filter, a valve apparatus placed below said filter and having seven casing-passages leading to outside openings together with movable ports mechanically connected with one another for conjoint operation, two of said passages being in communication with said filter, another passage forming a house-passage, two others forming waste-passages, and two others still forming supply-passages, and said movable ports being so arranged that in three positions thereof one filter-passage is separately put in communication with a house, a waste and a supply passage respectively, while the other filter-passage is in two of said three positions put in communication with a supply and in a third position with a waste passage, and that when said ports are placed in a fourth position a filter-passage is put in communication with a waste-passage, without putting either supply-passage in communication with the filter, and that when they are given a fifth position the house-passage is put in communication with a supply-passage while the water from each supply-passage is stopped from flowing through the filter, substantially as described.

36. In combination with a filter, a valve apparatus placed below said filter and having seven casing-passages leading to outside openings together with movable ports mechanically connected with one another for conjoint operation, two of said passages being in communication with said filter, another passage forming a house-passage, two others forming waste-passages, and two others still forming supply-passages, and said movable ports being so arranged that in three positions thereof one filter-passage is separately put in communication with a house, a waste and a supply passage respectively while the other filter-passage is in two of said three positions put in communication with a supply and in a third position with a waste passage, and that when said ports are placed in a fourth position a filter-passage is put in communication with a waste-passage and a supply-passage with the house-passage, substantially as described.

37. In combination with a filter, a valve apparatus having six casing-passages leading to outside openings in one compound casing together with movable ports in one key turning in said casing, two casing-passages being in communication with the filter, two passages forming supply-passages, and two passages constituting discharge-passages for water which has passed through the filter, and said movable ports being arranged in different positions of said key to put each filter-passage in turn in communication directly through the said key with a supply or a discharge passage the other filter-passage being at the same time put in communication directly through said key with a discharge or a supply passage, substantially as described.

38. In combination with a filter, a valve apparatus having six casing-passages leading to outside openings in one compound casing together with movable ports in one key turning in said casing, two casing-passages being in communication with the filter, two passages constituting supply-passages, and two passages constituting discharge-passages, and the said ports being so arranged that in one position of said key one filter-passage is put in communication with a supply-passage, while at the same time the other filter-passage is put in communication with a discharge-passage, that in a second position the last-mentioned filter-passage is put in communication with a supply and the former with a discharge passage, and that when given a third position a discharge and a supply passage are put in communication with each other while at the same time the flow of water from the supply-passages through the filter, is stopped, substantially as described.

39. A valve as E F having four casing-passages leading from the same key-space, together with movable ports opening from the same central chamber in the valve-key and separated by angles which severally correspond with those between adjacent and diametrically opposite passages in the case of four at least of the six pairs possible with four passages, in combination with a valve as D mechanically connected with the former for conjoint operation and having three casing-passages leading from a key-space common to all, together with movable ports opening from a central chamber in the valve's key common to all these last-mentioned ports, two of the casing-passages last mentioned being separated from each other by an angle similar to that which separates two of the first-mentioned casing-passages from each other, and the movable ports last mentioned being arranged to put a casing-passage of said second-mentioned valve D in separate communication with another of its casing-passages in two positions of the first-mentioned valve E F and in separate communication with the remaining casing-passages of said second valve D** in a third position of said first-mentioned valve E F, substantially as described.

40. A valve as E F having four casing-passages leading from the same key-space and each separated from the next passage on either side by an angle of ninety degrees together with movable ports opening from the same central chamber in the valve-key, said ports being arranged at the ends of four radii two of which are in line with each other on opposite sides of the center and the other two are separated from each other by an angle of ninety degrees and lie on opposite sides of the first-mentioned two radii, substantially as described.

41. A valve as E F having four casing-passages leading from the same key-space and each separated from the next passage on either side by an angle of ninety degrees together with movable ports opening from the same central chamber in the valve-key, said ports being arranged at the ends of four radii two of which are in line with each other on opposite sides of the center and the other two are separated from each other by an angle of ninety degrees and lie on opposite sides of the first-mentioned two radii, in combination with a second valve as D** connected with the former for conjoint operation and having three casing-passages leading from a key-space common to all these last-mentioned passages and two of them separated from each other by an angle of ninety degrees together with movable ports opening from a central chamber in this valve's key common to all the last-mentioned ports, a movable port being arranged at the end of each of two radii which form an oblique angle with each other, substantially as described.

42. In combination with a filter, a current-reversing filter-draining and cut-off valve apparatus placed below the filter-chamber, said apparatus having house, waste supply and filter passages and a system of connected valves or ports whereby communication to the filter-chamber and to and from the house-pipe can be stopped and at the same time a waste-pipe connection be opened from the bottom of said chamber, said valves or ports also serving to send the current through the filter in the filtering direction to the house-pipe and in the washing direction to the waste-pipe, substantially as described.

43. In combination with a filter, a current-reversing by-pass filter-draining and cut-off valve placed below the filter-chamber and connected with the top and bottom thereof, said apparatus having house, waste, supply and filter ways and a system of connected valves or ports whereby the current can be sent through the filter in the filtering direction to the house-pipe and in the washing direction to the waste-pipe, and can be sent direct to the house-pipe, and can be cut off from the house-pipe, and whereby further the bottom of the filter-chamber can be connected with the waste-pipe while the supply is cut off from said chamber and from the house-pipe, substantially as described.

44. In combination with a filter, a valve apparatus placed below said filter and comprising current-reversing, filtered-water and filter-draining valves connected with one another for conjoint operation, so that in different positions of said valves the water may be sent through the filter in the filtering direction to house, or in the filtering direction to waste, or in the washing direction to waste, and that in other positions the bottom of the filter and the upright pipe leading to the top thereof may be put in communication with the waste for emptying said filter and upright pipe while at the same time the filter is cut off from the house and supply passages, substantially as described.

45. In combination with a filter, a valve apparatus placed below said filter and comprising current-reversing, filtered-water, filter-draining and by-pass valves connected with one another for conjoint operation, so that in different positions of said valves the water may be sent through the filter in the filtering direction to house, or in the filtering direction to waste, or in the washing direction to waste, or may be cut off from the filter while at the same time the bottom of said filter is put in communication with the waste for emptying said filter, or may be prevented from flowing through the filter while at the same time it is sent to house through the by-pass connection, the said valves being further adapted to connect the upright pipe leading to the top of the filter with the waste while the filter is cut off from the supply, substantially as described.

46. A valve apparatus having two sets of ports in the key portion of said apparatus together with filter, waste, house and supply passages in the casing, said ports and passages being arranged not only to connect either of the filter-passages with the waste while the other is connected with the supply, and to connect one of them to house while the other is connected with the supply, but also in another position of said valve apparatus to establish a by-pass from supply to house through one set of ports and to connect a filter-passage to waste through the other set of ports, while at the same time cutting off both filter-passages from the supply, substantially as described.

47. In combination with a filter, a valve apparatus placed below said filter and having two sets of ports in the key portion of said valve apparatus together with filter, waste, house and supply passages in said casing, said ports and passages being arranged not only to connect either of the filter-passages with the waste while the other is connected with the supply, and to connect one of them to house while the other is connected with the supply, but also in another position of said valve apparatus to establish a by-pass from supply to house through one set of ports and to connect the upright pipe leading to the top of said filter with the waste-passage through the other set of ports, while at the same time cutting off both filter-passages from the supply, substantially as described.

In testimony whereof I affix my signature in presence of two witnesses.

JOSEPH T. MANNING.

Witnesses:
WALTER W. H. ROBINSON, Jr.,
B. T. WEBSTER.